Nov. 28, 1967  J. R. NEELY  3,355,222
GYRATORY FLUIDIZED SOLIDS FEEDER
Filed April 4, 1966  2 Sheets-Sheet 1

INVENTOR
James R. Neely

BY  *James G. O'Neill*

AGENT

INVENTOR
James R. Neely

BY James G. O'Neill

AGENT

United States Patent Office 3,355,222
Patented Nov. 28, 1967

3,355,222
GYRATORY FLUIDIZED SOLIDS FEEDER
James R. Neely, Oxon Hill, Md., assignor to the United States of America as represented by the Secretary of the Navy
Filed Apr. 4, 1966, Ser. No. 540,100
9 Claims. (Cl. 302—56)

ABSTRACT OF THE DISCLOSURE

A fluidized solids feeder is fixedly secured to a horizontally disposed gyratory platform. Mounted vertically beneath the center of the platform is a motor which is rigidly attached to the platform. A first eccentric weight is fastened to the motor shaft above the motor and a second eccentric weight below the motor. The entire assembly is suspended on a set of springs which are attached to a base. The gyratory motion of the platform caused by rotation of the motor and weights imparts a spiral motion to the solids in a swirling chamber in the feeder; the solids are then fed downstream by use of gas fluidization techniques.

---

The invention described herein may be manufactured and used by or for the Government of the United States for governmental purposes without the payment of any royalties thereon or therefor.

This invention relates to a solids feeding device and more particularly to a gyratory vibrational pneumatic solids feeder to be used in a system for mixing solids and liquids.

In the past, the techniques utilized for continuously mixing the solid and liquid constituents of rocket propellants have possessed many inherent dangers and problems due to the nature of the apparatus which it was necessary to utilize. For example, the solids feeding system currently used in the pneumatic mix process consists of a horizontal screw feeder, modified to withstand internal pressures of 30 p.s.i.g., and specifically designed gas manifolds for dispersing and transporting the solids to the process with gas flow. Feeders of this type are dangerous for the manufacture of propellants because of the possibility of having particles caught and fractured between moving parts with a resultant explosion. Also, helical feeds are subject to pressure limitations which limit product output rate; moreover, occasional bridging and plugging with non-free flowing solids limits the reliability of the system. Helical feeders also provide a pulsing output because of the rotation of the screw.

Although mechanical feeders, of which the horizontal screw feeder is an example, normally meet feed rate accuracy requirements, the preceding disadvantages make them undesirable for the manufacture of composite solid propellants. The other two basic types of existing solid feeders, the "fluidized feeder" and the "vibrational feeder," will not reliably meet the accuracy requirements with non-freeflowing powders. The present invention was developed to provide a remotely and automatically controlled solids feeding system capable of accurately metering non-freeflowing powdered and granular propellant ingredients into a pneumatic mix process of the type disclosed in Patent No. 3,193,991. This metering is accomplished against process pressures of at least 50 p.s.i.g. without the use of moving parts in contact with the materials being fed.

It is therefore a primary object of the present invention to provide a new and improved solids feeder.

It is another object of this invention to provide a new and improved solids feeder for continuously blending particular solid materials.

It is a further object of this invention to provide a new and improved solids feeder having no moving parts in contact with the material to be fed.

It is a still further object of this invention to provide a new and improved solids feeder capable of operation at high pressures while being free of hold-ups.

Still another object of this invention is to provide a new and improved gyratory vibrational pneumatic solids feeder.

With these and other objects in view, the present invention contemplates a solids feeder having a small funnel placed through the center of a sintered stainless steel porous plate located at the bottom of a sainless steel tube. The entire feeder unit is mounted on a gyratory vibrational platform which is capable of vibrating about its center of mass. Powdered or granular solids are vibrated into the feeder unit from an attached hopper through a screen baffle placed across the top of the tube. The solids are then energized into a gyratory vibrational pattern in the funnel and fed therefrom through the funnel orifice with gas flow. The solids feed rate is proportional to the differential pressure between the feeder and the solids discharge, regardless of the operating pressure.

Other objects, advantages and novel features of the invention will become readily apparent upon consideration of the following detailed description when read in conjunction with the accompanying drawings wherein.

Figure 1:
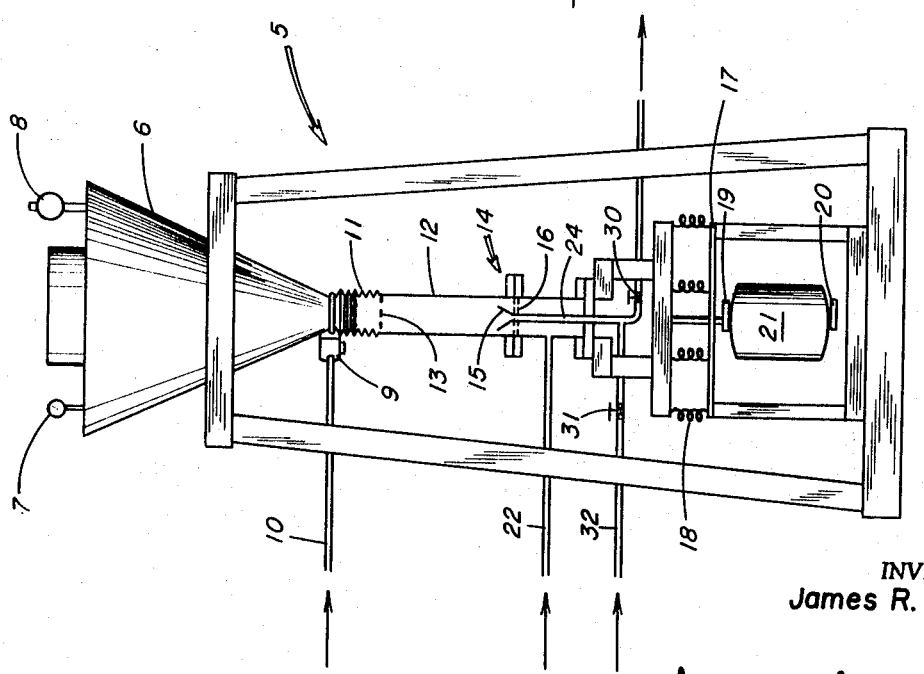
FIG. 1 is a view, partially in section, of the solids feeder of the present invention.

Referring now to FIG. 1, there is shown a preferred embodiment of the vibratory pneumatic solids feeder at 5. The feeder is comprised of a hopper 6 having a pressure gage 7 and a pressure relief valve 8 on the upper end thereof. A vibrator 9 connected to the hopper is operated by gas from line 10. A vibration absorber 11 is attached to the bottom of the hopper and to a circular, stainless steel tube 12, approximately 3½" in diameter and 12" long. Tube 12 provides a fluidization chamber or zone, the operation of which will be more fully described hereinafter. A screen baffle 13 is placed at the connection between the absorber and tube. The actual feeding unit 14, consisting of a small funnel 15 held in the center of a circular, sintered stainless steel, porous plate 16, is located at the bottom of the tube. This entire feeding unit is mounted on a gyratory vibrational platform 17 by springs 18.

Platform 17 is operated by two eccentric weights 19 and 20 connected to the upper and lower ends, respectively, of the shaft of a motor 21. The platform is caused to gyrate or vibrate around its center of mass by the rotation of the weights 19 and 20. Rotation of the top weight 19 causes circular vibration in the horizontal plane of platform 17 while rotation of the lower weight 20 acts to tilt the platform thereby causing elliptical vibrations in the radial (or vertical) plane as well as in the tangential plane, which is perpendicular to the radial plane. For a more complete discussion of a similar gyratory platform used for a different purpose, see D. G. Brant, "The Principles and Applications of a Revolutionary Screening Device," The American Ceramic Society Bulletin, 32(8):267–271, August 1953.

Gas to carry the powdered material is fed into the feeding unit 14, after passing upwardly through the porous plate 16, by line 22.

Figure 2:
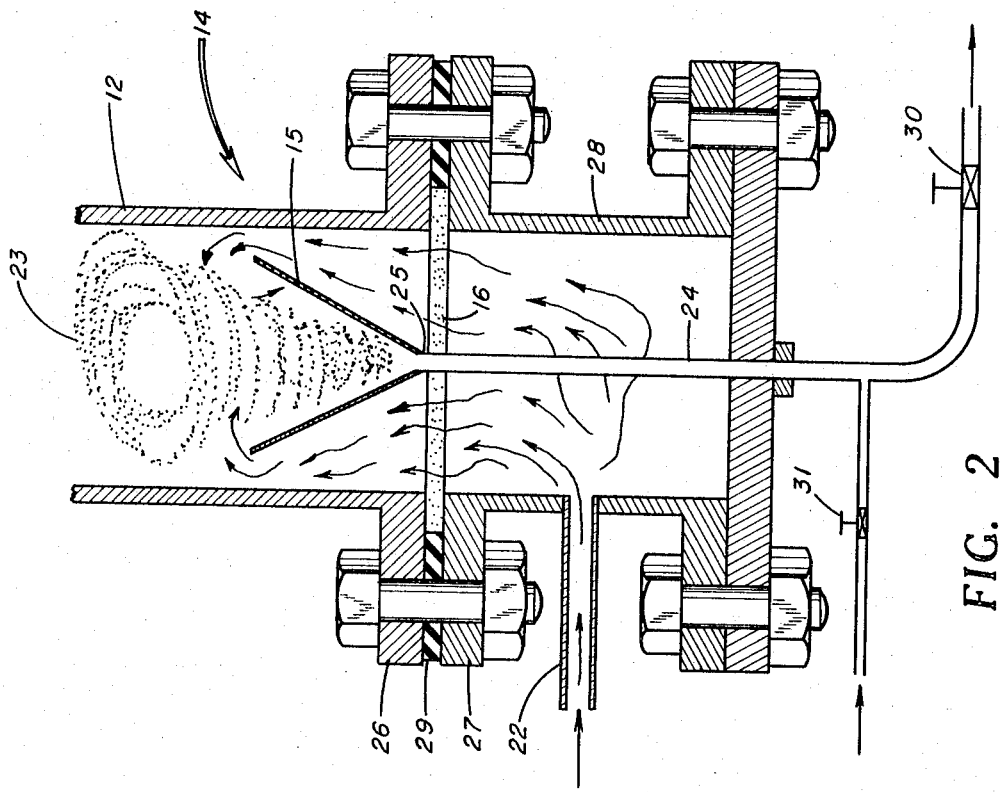
FIG. 2 is an enlarged view in cross-section of the feeding section of the present invention.

Referring now to FIG. 2, there is shown an enlarged view of the feeding unit 14. The gyratory vibration of the platform provides a consistent and reproducible form of energy that maintains the solids, in the funnel, in a constant pattern of spiral motion, as shown at 23. The solid particles are thus raised to an energized or fluid state from which they can be fed at controlled rates with gas flow.

The energized solids are then fed from the funnel orifice 25 through line 24 to continuous mixing apparatus of the type disclosed in Pat. No. 3,193,991.

A flange 26 fixed to the end of tube 12 is bolted to a similar flange 27 fixed to manifold 28 through which air is passed to the feeding section. Porous plate 16 is fixedly held between the two flanges. A gasket 29 is clamped between the flanges at the outside diameter of the circular porous plate to prevent leakage of air from the manifold and tube.

The flow of the gas and solid mixture is started or stopped by manipulating valves 30 and 31. To start operation, valve 30, in discharge line 24, is closed and valve 31, in gas line 32, is opened to pressurize the feeder. The discharge valve 30 is then opened and valve 31 closed. To stop operation, valve 31 is opened to clear the conveying line and the discharge valve 30 is closed.

Figure 3:
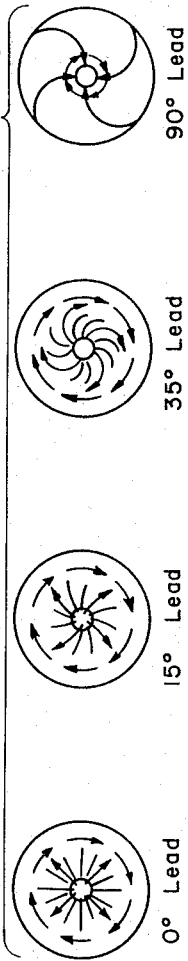
FIG. 3 shows the pattern effects of different lead angles given to the lower weights of the gyratory vibrator.

As shown in FIG. 3, the angle of lead given the lower weight 20 with relation to the upper weight 19, determines the type of spiral pattern produced by the solids in the funnel. The spiral patterns thus produced are much more dense and stable in the energized state than those produced in any known feeder. This results in high solids to gas ratios, consistent and reproducible flow rates, and maintenance of homogeneous particle size distribution without separation. The most desirable results are obtained with a lead angle of 90°.

Figure 4:
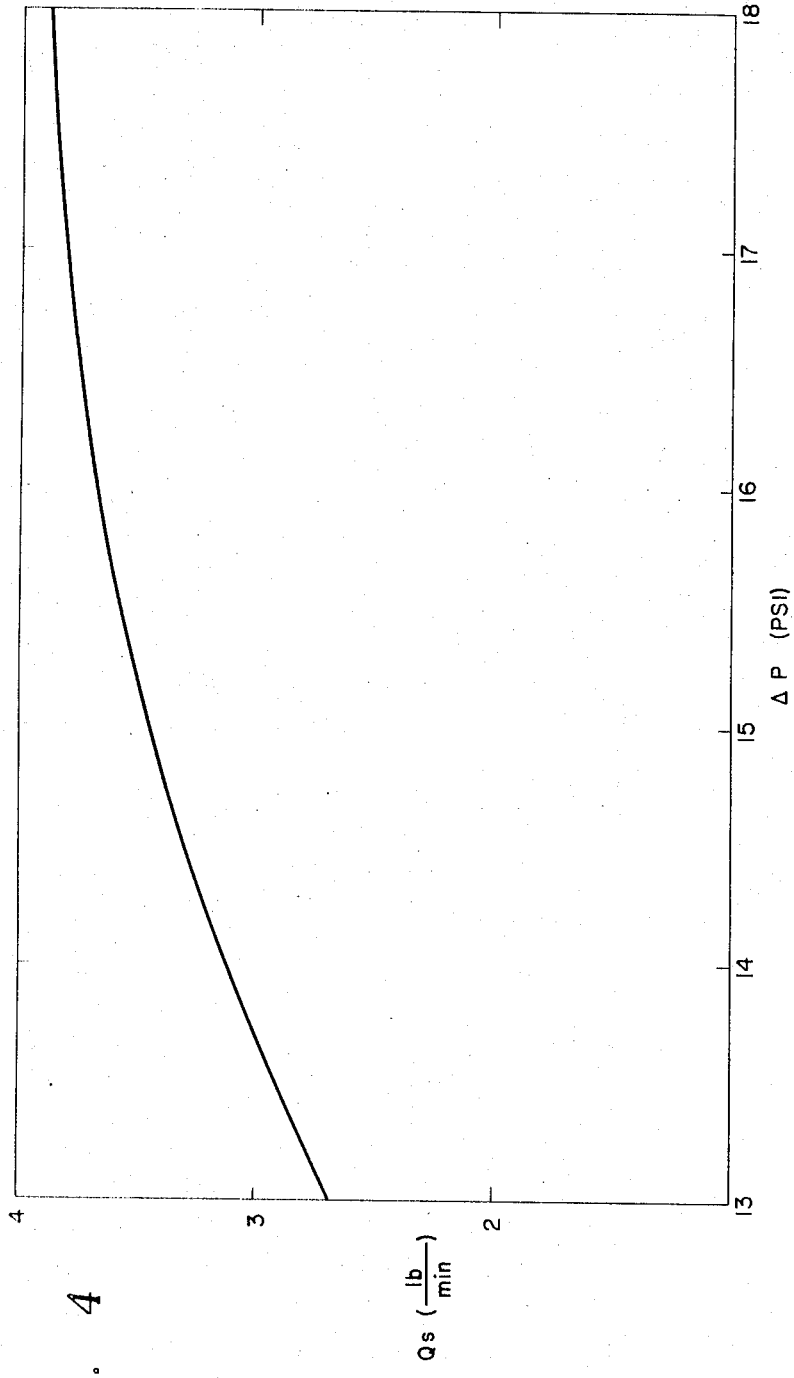
FIG. 4 shows a typical calibration curve equating flow rate versus differential pressure.

FIG. 4 shows a plot of flow rate ($Qs$) versus differential pressure ($\Delta P$) with a fixed funnel orifice and discharge line size. The differential pressure is the difference between the pressure in the feeding unit and the pressure in the end of the solids discharge line (the continuous mixing apparatus), regardless of the operating pressure of the feeding unit. As shown, the flow rate of the feeding unit of this invention is increased with an increase in pressure differential. Previously known units were limited in the accurate control of the flow rate by the building up of the solids, and such previously known units were additionally limited to low density flow.

*Operation*

In order that a better understanding of the invention might be had, its mode of operation will now be described. Powdered or granular solids, such as powdered potassium chloride (KCl), are placed in the hopper 6. These solids are then vibrated into the feeding unit through screen 13 by the hopper vibrator 9. Baffle screen 13 is preferably formed of ⅛ inch screen to cancel the effect of the solids head as well as break up lumps and prevent the passage of larger objects into the feeding unit. The solids are then energized into a vibrational or "whirlpool" pattern by the action of the platform 17. Gas from line 22 is distributed evenly around funnel 15 by the porous plate 16. The gas penetrates the moving "whirlpool" of powder from the outside and is interdispersed within it, thus conveying the solid particles through the funnel orifice when sufficient pressure is developed to overcome the pressure drop of the orifice and discharge line to maintain sufficient particle velocity. The minimum pressure to accomplish this determines the minimum solids flow rate with a fixed orifice and line size. Additional differential pressure will increase the flow rate of the material, as shown in FIG. 4.

The present invention offers several advantages in the field of solids handling, many of which are extremely desirable in the area of metering non-freeflowing explosive powders. The gyratory vibration provides a consistent and reproducible form of energy that maintains the solids in a constant pattern of spiral motion. The feeding section functions so that a gas transports the energized powder out of the orifice of the funnel at desired rates; while the "whirlpool" motion of the material ensures that the funnel is constantly full. The overall system is able to deliver powdered and granular solids in a smooth, consistent flow with calibrated accuracies of better than 99%, without the use of moving parts in contact with the material being fed. Furthermore, solids can be fed into processes having high internal pressures greater than 100 p.s.i.g., without the problems of plugging and bridging of the non-freeflowing solids encountered in currently used devices. Finally, the feeder is capable of discharging solids with concentrations ranging from 40 to 90 pounds of solids per actual cubic foot of conveying gas depending on flow characteristics of the materials. This results in lower solids velocity with less particle attrition and dusting, less gas consumption, and easier gas-solids separation.

Modifications of the disclosed invention will immediately suggest themselves to those skilled in the art. It is therefore to be understood that the disclosed embodiment simply represents a preferred form of the present invention to be limited only by the appended claims.

What is claimed is:
1. A solids feeder comprising:
   means providing a fluidization chamber having upper, central, and lower parts;
   solids inlet means for admitting solids to the upper part of said chamber;
   gas inlet means for admitting gas to the lower part of said chamber;
   outlet means for exhausting a mixture of solids and gas from the lower part of said chamber;
   platform means substantially horizontally disposed and fixedly secured to said means providing a fluidization chamber, said platform means being substantially flat;
   resilient support means secured to said platform means in such a manner as to resiliently suspend said platform means for limited movement in any direction; and
   means fixedly secured to said platform means for imparting thereto gyratory motion in the horizontal plane thereof and in the radial and tangential planes with respect thereto.
2. The solids feeder of claim 1 wherein said means for imparting gyratory motion to said platform means comprises:
   motor means substantially vertically disposed beneath said platform means and fixedly secured thereto at substantially the center thereof, said motor means having a substantially vertically disposed shaft extending above and below the central portion of said motor means;
   first weight means fixedly secured to said shaft above the central portion of said motor means, the center of gravity of said first weight means being eccentrically disposed with respect to said shaft; and
   second weight means fixedly secured to said shaft below the central portion of said motor means, the center of gravity of said second weight means being eccentrically disposed with respect to said shaft.
3. The apparatus of claim 2 wherein the centers of gravity of said first and second weight means are angularly displaced with respect to each other.
4. The apparatus of claim 3 wherein said centers of gravity of said first and second weight means are angularly displaced wtih respect to each other by an angle of 90°.
5. The solids feeder of claim 1 wherein said outlet means is disposed substantially centrally of said means providing a fluidization chamber and said solids feeder further comprises;
   funnel means disposed within said chamber and fixedly secured to said outlet means.

6. The apparatus of claim 1 further comprising:
baffle screen means disposed within said chamber and fixedly secured therein between said solids inlet means and the central part of said chamber.

7. A solids feeder comprising:
a base means;
substantially flat platform means;
resilient support means secured to said platform means and said base means in such a manner as to resiliently suspend from said base means said platform means in a substantial horizontal position for limited movement in any direction with respect to said base means;
motor means fixedly secured to said platform means substantially centrally thereof, said motor means being substantially vertically disposed beneath said platform means and having a substantially disposed shaft extending above and below the central portion of said motor means;
first weight means fixedly secured to said shaft above the central portion of said motor means, the center of gravity of said first weight means being eccentrically displaced from the axis of said shaft;
second weight means fixedly secured to said shaft below the central portion of said motor means, the center of gravity of said second weight means being eccentrically displaced from the axis of said shaft, the centers of gravity of said first and second weight means being angularly displaced with respect to each other;
substantially vertical elongated means fixedly secured to said platform means for providing a fluidization chamber having upper, central, and lower parts;
solids inlet means for admitting solids to the upper part of said chamber;
gas inlet means for admitting gas to the lower part of said chamber;
outlet means for exhausting a mixture of solids and gas from the lower part of said chamber, a portion of said outlet means being disposed within the central part of said chamber;
funnel means disposed within the central part of said chamber, said funnel means being fixedly secured to said outlet means;
porous plate means substantially horizontally disposed within said chamber and fixedly secured therein between said gas inlet means and said funnel means;
baffle screen means substantially horizontally disposed within said chamber and fixedly secured therein between said solids inlet means and the central part of said chamber;
hopper means for storing a quantity of solids therein;
gas driven vibrating means fixedly secured to the bottom of said hopper means;
means for supplying gas to said vibrating means;
vibration absorber means connected to said hopper means at the bottom thereof and to said means for providing a fluidization chamber at the top thereof to absorb vibrations therebetween;
whereby rotation of said motor means and said first and second weight means attached to the shaft thereof causes said platform means and said means for providing a fluidization chamber to assume a gyratory motion in the horizontal plane of said platform means and in the radial and tangential planes with respect thereto so as to cause solids entering said chamber to assume a spiral motion, and
whereby gas entering the chamber will mix with the solids therein and a high solid-to-gas ratio mixture so formed may be fed into a mixing apparatus at an accurately controlled and uniform rate of flow.

8. A process of feeding solids at a uniform and accurately controlled flow rate which comprises the steps of:
charging said solids continually to a fluidization zone;
energizing said solids by imparting gyratory movement thereto in the horizontal and vertical planes;
fluidizing said enlarged solids within said zone by admitting fluidizing gas into a lower part of the zone and circulating the admitted gas upward into a central part of the zone where said gas and said energized solids are united as a mixture; and
discharging the gas-solid mixture so formed from said zone at a substantially constant flow rate.

9. The process of claim 8 wherein said solids are charged continually to said fluidization zone at controlled average rate.

References Cited
UNITED STATES PATENTS

| | | | |
|---|---|---|---|
| 3,062,589 | 11/1962 | Hawkinson et al. | 302—56 |
| 3,091,368 | 5/1963 | Harley et al. | 302—36 |
| 3,189,061 | 6/1965 | Stockel et al. | 222—195 |
| 3,226,165 | 12/1965 | Oehlrich et al. | 302—17 |
| 3,295,895 | 1/1967 | Latham | 302—17 |

ANDRES H. NIELSEN, *Primary Examiner.*